(12) United States Patent
Bal et al.

(10) Patent No.: US 6,691,168 B1
(45) Date of Patent: Feb. 10, 2004

(54) METHOD AND APPARATUS FOR HIGH-SPEED NETWORK RULE PROCESSING

(75) Inventors: Subhash Bal, Calabasas, CA (US);
Raghunath Iyer, Los Altos, CA (US);
Sundar Iyer, Stanford, CA (US);
Ramana Rao, Hyderabad (IN)

(73) Assignee: PMC-Sierra

( * ) Notice: Subject to any disclaimer, the term of this patent is extended or adjusted under 35 U.S.C. 154(b) by 0 days.

(21) Appl. No.: 09/246,572

(22) Filed: Feb. 8, 1999

Related U.S. Application Data

(63) Continuation-in-part of application No. 09/224,382, filed on Dec. 31, 1998, now abandoned.

(51) Int. Cl.[7] .............................................. G06F 15/173
(52) U.S. Cl. ....................... 709/238; 709/229; 709/239; 709/240; 709/241; 709/242; 370/351; 370/389; 370/428
(58) Field of Search ................................ 709/225, 226, 709/229, 238, 239, 240, 241, 242; 370/351, 389, 428

(56) References Cited

U.S. PATENT DOCUMENTS

| | | | | |
|---|---|---|---|---|
| 5,463,777 A | * | 10/1995 | Bialkowski et al. | 707/102 |
| 5,574,910 A | * | 11/1996 | Bialkowski et al. | 707/1 |
| 5,920,886 A | * | 7/1999 | Feldmeier | 711/108 |
| 5,951,651 A | * | 9/1999 | Lakshman et al. | 709/239 |
| 6,012,061 A | * | 1/2000 | Sharma | 707/100 |
| 6,157,955 A | * | 12/2000 | Narad et al. | 709/228 |
| 6,170,012 B1 | * | 1/2001 | Coss et al. | 709/229 |
| 6,223,172 B1 | * | 4/2001 | Hunter et al. | 707/3 |
| 6,289,013 B1 | * | 9/2001 | Lakshman et al. | 370/389 |
| 6,341,130 B1 | * | 1/2002 | Lakshman et al. | 370/389 |
| 6,389,532 B1 | * | 5/2002 | Gupta et al. | 713/163 |
| 6,412,000 B1 | * | 6/2002 | Riddle et al. | 709/224 |
| 6,457,051 B1 | * | 9/2002 | Riddle et al. | 709/224 |

OTHER PUBLICATIONS

Lakshman, T.V. et al., "High–Speed Policy–based Packet Forwarding Using Efficient Multi–dimensional Range Matching", *Computer Communication Review*, vol. 28, No. 4, Oct. 1998, ISSN# 0146–4833, 12 pages.

* cited by examiner

*Primary Examiner*—Saleh Najjar
(74) *Attorney, Agent, or Firm*—Dag Johansen; Stattler, Adeli, & Johanson, LLP

(57) ABSTRACT

As Internet packet flow increases, the demand for high speed packet filtering has grown. The present invention introduces several methods for a high-speed rule processing. The methods are geared towards Internet Protocol (IP) packet processing.

8 Claims, 18 Drawing Sheets

*Fig. 2* Transport Control Protocol Packet

Rule A = X{10, 29}, Y{20, 29}
Rule B = X{20, 39}, Y{10, 24}

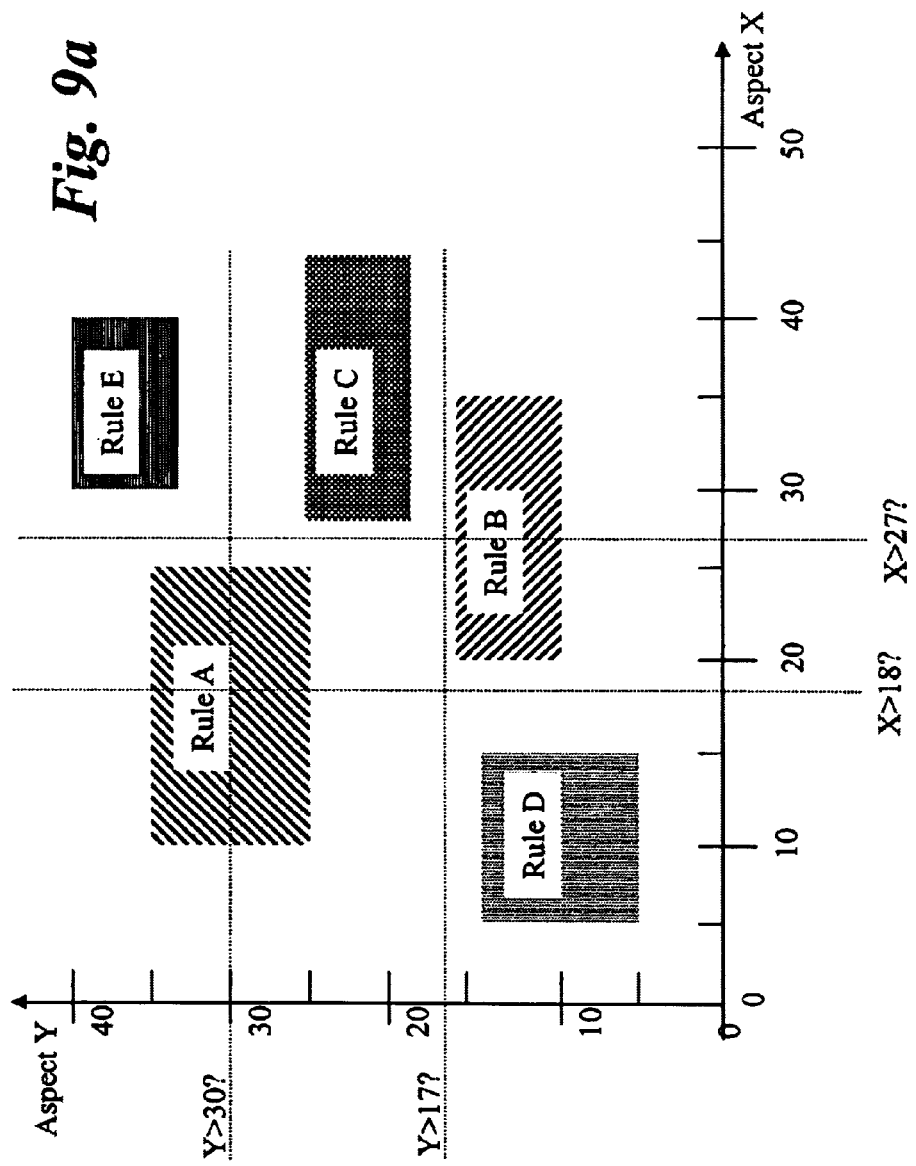

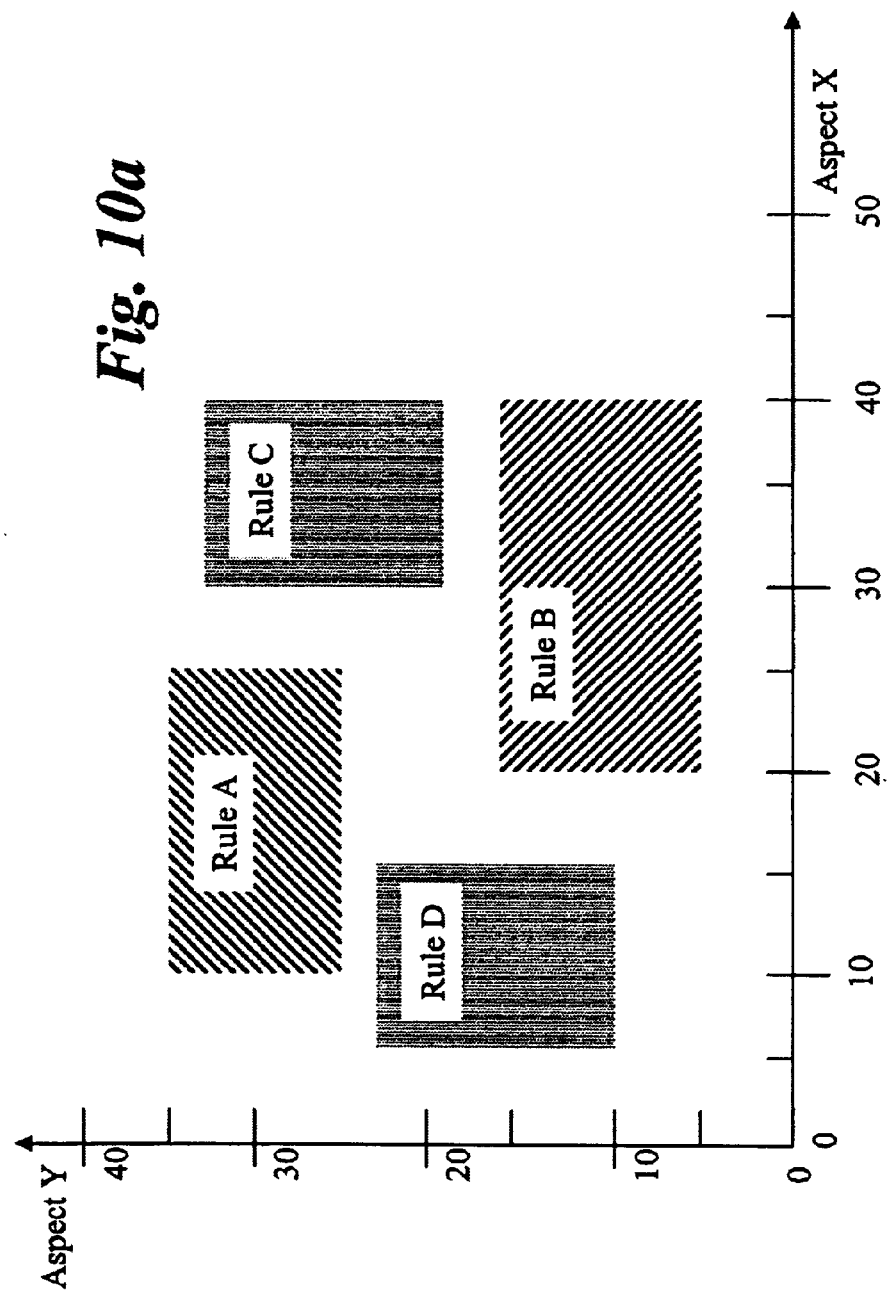

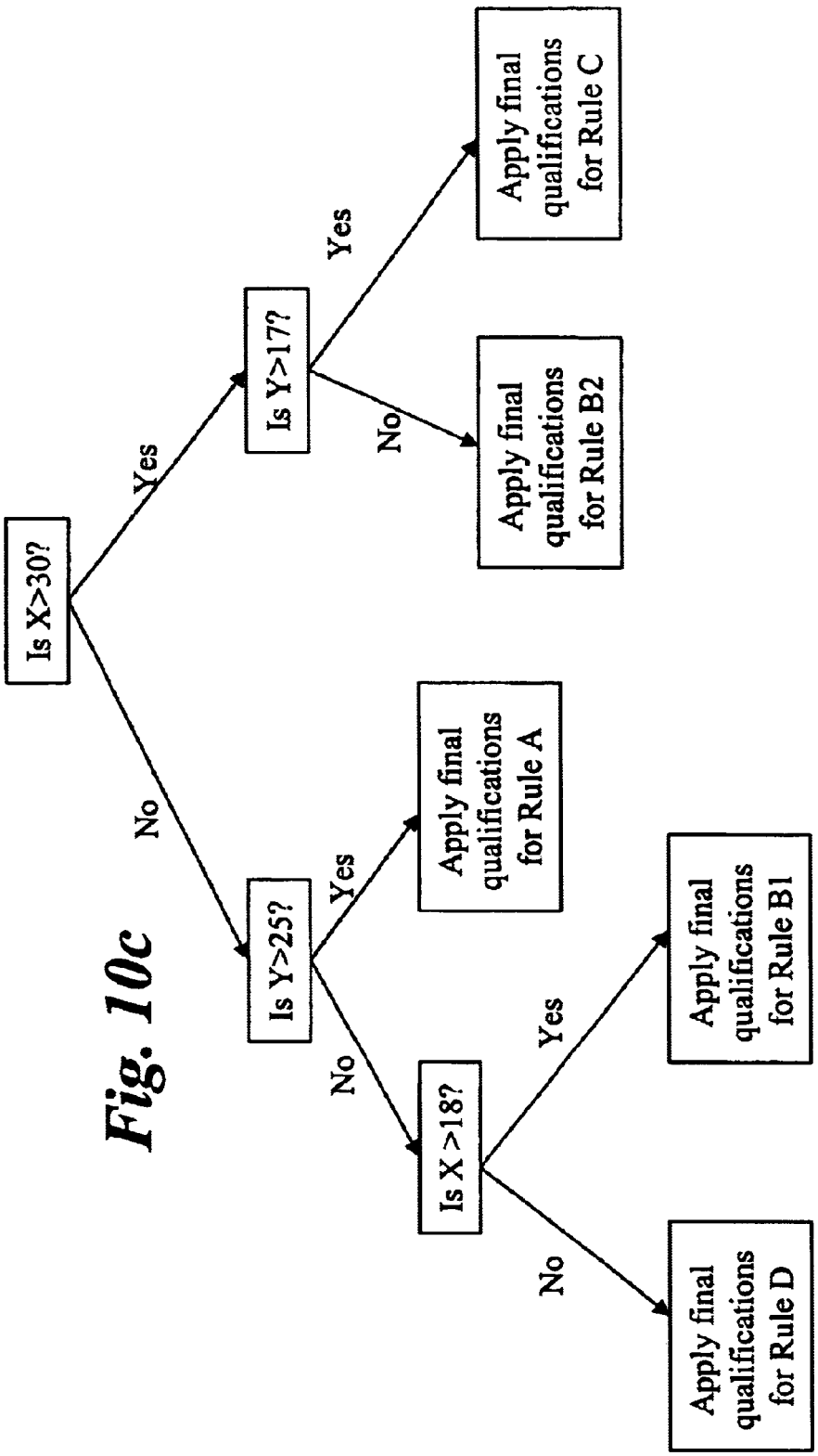

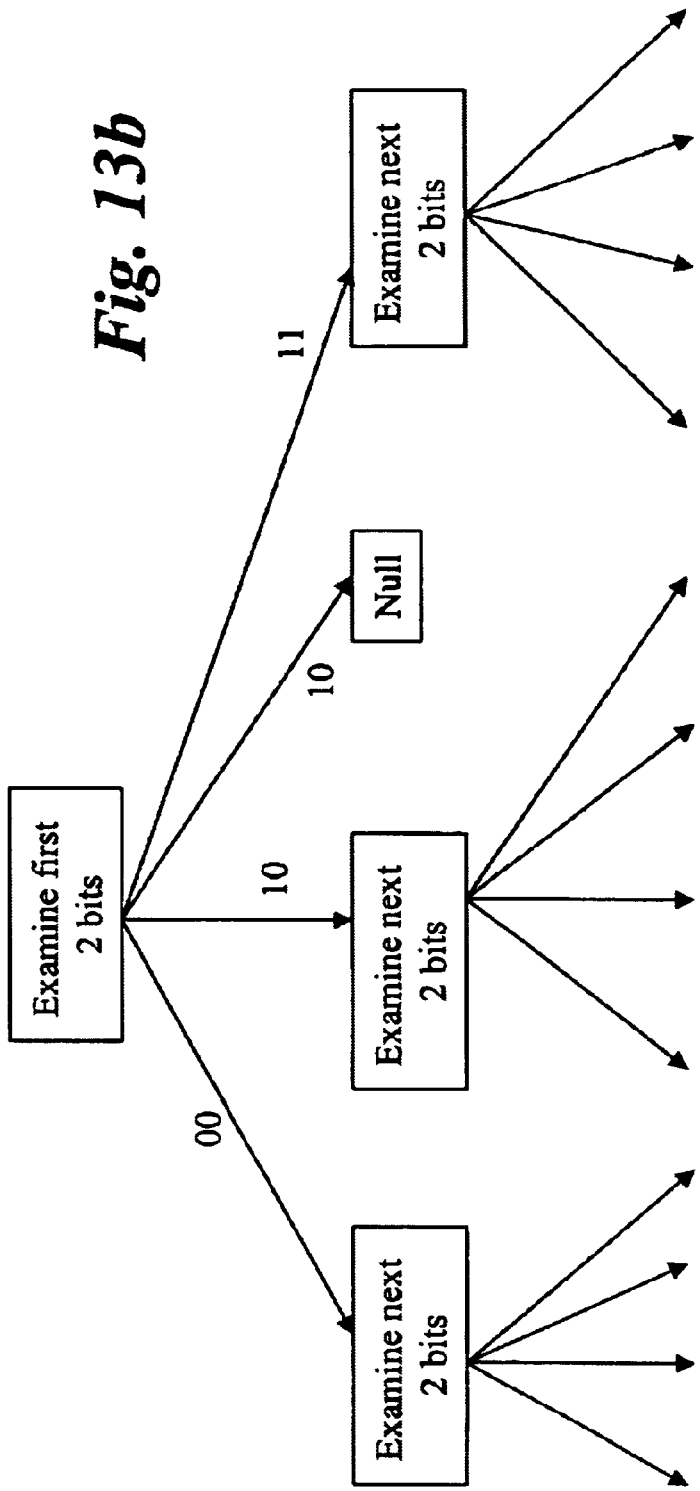

METHOD AND APPARATUS FOR HIGH-SPEED NETWORK RULE PROCESSING

CROSS-REFERENCE TO RELATED APPLICATION

The present application is continuatin-in-part of application Ser. No. 09/224,382, filed Dec. 31, 1998 now abandoned, "Method and Apparatus for High-Speed Network Rule Processing" by Raghunath Iyer, one of the inventors hereof. This application is incorporated herein by reference.

FIELD OF THE INVENTION

The present invention relates to the field of computer networking. In particular the present invention discloses a method and apparatus for quickly processing network packets that are tested with a large number of rules.

BACKGROUND OF THE INVENTION

The Internet is a global interconnection of computer networks that share a set of well-defined data communication protocols. Specifically, most computer networks coupled to the global Internet communicate using the Transport Control Protocol (TCP) and Internet Protocol (IP).

A very large portion of the computers communicate on the global Internet are coupled to a local area network (LAN) that is coupled to the global Internet with an Internet gateway. The Internet gateway handles all communication between computers on the local area network and computers out on the global Internet. The Internet gateway may perform many different functions such as network address translation, network caching, routing, and packet filtering.

Packet filtering is the task of examining each packet to apply a set of filtering rules. Each packet-filtering rule specifies a particular packet filtering policy. For example, all packets incoming from the Internet that are destined for vulnerable server ports may be discarded in order to protect the internal servers on the local area network.

The number of packet filtering rules that are needed depends on the particular application. In simple packet filtering routers for small or home routers, the number of packet filtering rules is relatively small. However, an internet service provider (ISP) that provides classes of service for the internet service provider's customers, the internet service provider will need many thousands of packet filter rules to implement the class of service priority and other customer features.

There are several different current implementations of packet filtering rule processors. The simplest implementation of a rules processor is a linear searching rule processor. In such an implementation, the linear rule processor tests each received packet against each rule in the list of packet filtering rules. The time required to perform this type of rule processing is directly proportional to the number of packet filtering rules. This type of linear rule processing is not feasible for any system with a large number of packet-filtering rules.

To provide faster rule processing, improved methods of applying packet-filtering rules were introduced. One improved method is known as "rule splitting." A rule splitting system divides the rules into several different sets of rules. When a packet is received, one or more aspects of the packet are examined to determine which subset of rules should be applied. For example, a rule splitting type of rule processor may only examine the Source and/or Destination ports of each packet in order to determine which set of rules to apply. Rule splitting types of rule processors are difficult to implement because rules have ranges associated with them.

Search trees provide another method of improving rule processing speed. Search trees divide the rules into a pre-processed organized format that improves the rule processing to a speed that is a logarithmic function of the number of rules in each dimension. This type of searching works well, but still does not provide a solution that is viable for high-speed network applications that require many thousands of rules. It would therefore be desirable to have an improved network rule processor that can process thousands of network rules.

SUMMARY OF THE INVENTION

The present invention introduces a high-speed rule processing method that may be used for packet filtering. The high-speed rule processor pre-processes a set of packet filtering rules such that the rules may be searched in parallel by a set of independent search units.

In the rule pre-processing of the method of the present invention, a set of packet filtering rules is first divided the rules into N dimensions. The N dimensions are orthogonal aspects of each packet that may be examined and tested in each rule. Each of the N dimensions are then divided into a set of dimension rule ranges wherein each rule range defines a non-overlapping contiguous range of values in a particular dimension and the rules that may apply to packets that fall within that rule range. Each rule range may be assigned an R-length bit vector that specifies the rules that may apply to packets that fall within that rule range. If the rules are prioritized wherein only the highest priority rule will be applied then such bit vectors will be organized into an order bit vector wherein the highest priority rule is at the beginning of the rule bit vector and the lowest priority rule will be at the end of the rule bit vector. The rule preprocessing is completed by creating a search structure (such as a look-up table, Patricia tree structure, or binary tree structure) for each of the N dimensions. Each search structure may be used by an independent search unit such that all N dimensions may be searched concurrently.

The packet processing method of the present invention activates the N independent search units to search the N pre-processor created search structures. In one embodiment, the output of each of the N search structures will be an R-length bit vector. In such an embodiment, the N output bit vectors are logically ANDed together to produce a final rule bit vector that is used to select the rule or rule to be applied. If the rules are prioritized, then only the first matching rule, (the highest priority rule) will be applied.

Other objects, features, and advantages of present invention will be apparent from the company drawings and from the following detailed description.

BRIEF DESCRIPTION OF THE DRAWINGS

The objects, features and advantages of the present invention will be apparent to one skilled in the art, in view of the following detailed description in which:

FIG. 9a illustrates a two-dimensional rule space with a set of disjoint rules that have no overlap.

FIG. 9b illustrates a search tree that may be used to search the disjoint two-dimensional rule space of FIG. 9a.

FIG. 10a illustrates a two-dimensional rule space with a set of disjoint rules that have no overlap wherein the rules cannot be divided evenly using one dimension.

FIG. 10c illustrates a search tree that may be used to search the disjoint two-dimensional rule space of FIG. 10a.

FIG. 13b illustrates a four-way search tree used to search entries with the concatenated search key of FIG. 13a.

DETAILED DESCRIPTION OF THE PREFERRED EMBODIMENT

A method and apparatus for performing high-speed network rule processing is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to an embodiment within a gateway that coupled a local area network to the global Internet. However, the same rule-processing engine can easily be used in other applications such as general-purpose routers, firewalls, and routers that give priority to packets having a higher class of service. Furthermore, the rule processing teachings of the present invention have been disclosed in a packet filtering application although the rule processing teachings may be used in many other contexts.

Network Packet Filtering

Network packet filtering is the task of examining each packet received from a network and then applying a set of packet filtering rules to the received packets. There are a number of uses for network packet filtering. For example, packet filtering can be used to provide security for a local area network by filtering out packets from potential intruders.

Example Packet Filtering Applications

Figure 1:
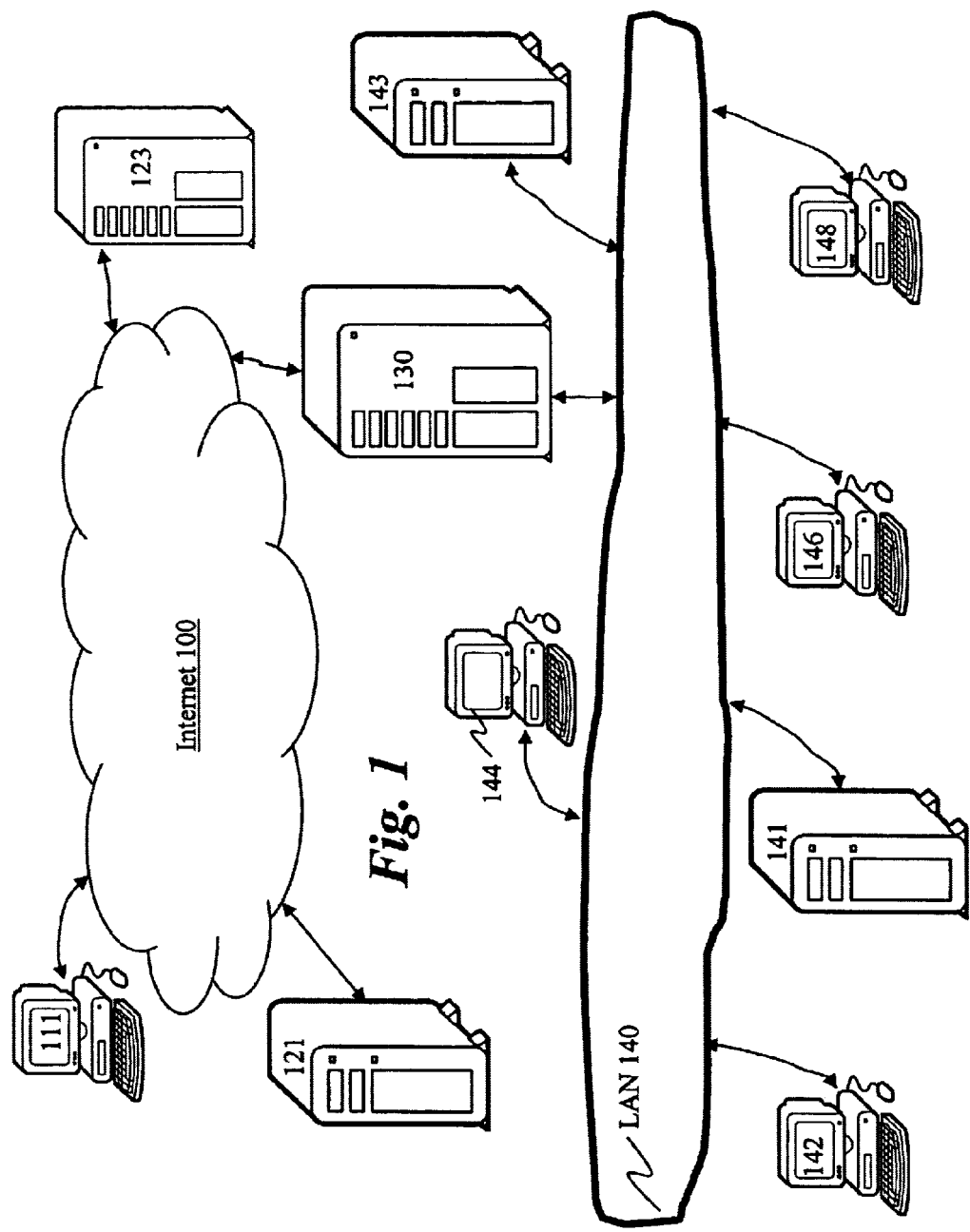
FIG. 1 illustrates a typical small local area network (LAN) coupled to the Internet through a packet filtering device that filters the packets that travel between the global Internet and the local area network.

FIG. 1 illustrates one possible network application of packet filtering. Referring to FIG. 1, a local area network (LAN) 140 is illustrated with a set of computer workstations 142, 144, 146, and 148 coupled thereto. The local area network (LAN) 140 environment also includes a couple of servers 141 and 143. If the servers 141 and 143 are only used for internal purposes then the internal servers 141 and 143 should only be accessible by internal clients such as computer workstations 142, 144, 146, and 148.

All communication between computer systems on the internal local area network 140 and the global Internet 100 passes through an Internet gateway 130. The Internet gateway 130 may comprise a suite of firewall applications on a computer system, a packet filtering router, or another type of network component that provides the desired features. Of particular interest to the present invention, most Internet gateway systems provide packet-filtering features.

As specified earlier, an important packet filtering application is network security. Specifically, when a network node on the global Internet 100 attempts to establish a connection to an internal server (such as server 141) on the local area network 140 then the Internet gateway 130 should carefully scrutinize the associate network packets since the entity attempting to establish the connection may be attempting an unauthorized access. To prevent such unauthorized access, the Internet gateway 130 processes packets with a set of security rules that screen out packets related to unauthorized actions. For example, if the servers 141 and 143 are only to be used for internal purposes then the Internet gateway 130 should screen out all packets originating from the global internet 100 and destined for the internal servers 141 and 143. The packet filtering rule processor of the Internet gateway 130 will perform such screening.

There are many different permutations of network security rule policies that may be implemented. For example, if the servers 141 and 143 are only to be used for internal purposes for one set of services (such as an internal database) and global access for other services (such as email) then the packet filtering rules in the Internet gateway 130 should screen out packets originating from the global Internet 100 and destined for the internal servers 141 and 143 only if the service requested is for internal use only. In a TCP/IP environment, the service is usually specified using a TCP port number.

Packet filtering can also be used by an Internet service provider to provide various different classes of service to a set of users. For example, packets from a high priority user will be processed and transmitted faster than packets from a low priority user. With such a packet filtering arrangement, the Internet service provider can charge different prices for different classes of service. There may be many different classes of service offered by the Internet service provider. For example, an Internet service provider may provide a large scale of different services from a free (advertising subsidized) email-only service to a high-speed high-quality service that can be used for low-latency tasks such as video conferencing. Such an application would require a very large number of rules applied to each packet to determine how the packet should be handled (if at all). Current packet filtering implementations are not capable of processing packets with a very large number packet filtering rules with low latency.

Packet Filtering Aspects

Network packets can be filtered by examining a number of different packet aspects. In an Internet application, the most interesting aspects to examine are in the Transport Control Protocol (TCP) packet header (or a UDP packet header) and the Internet Protocol (IP) packet header. In normal Internet usage, TCP packets are enclosed within IP packets.

Figure 2:
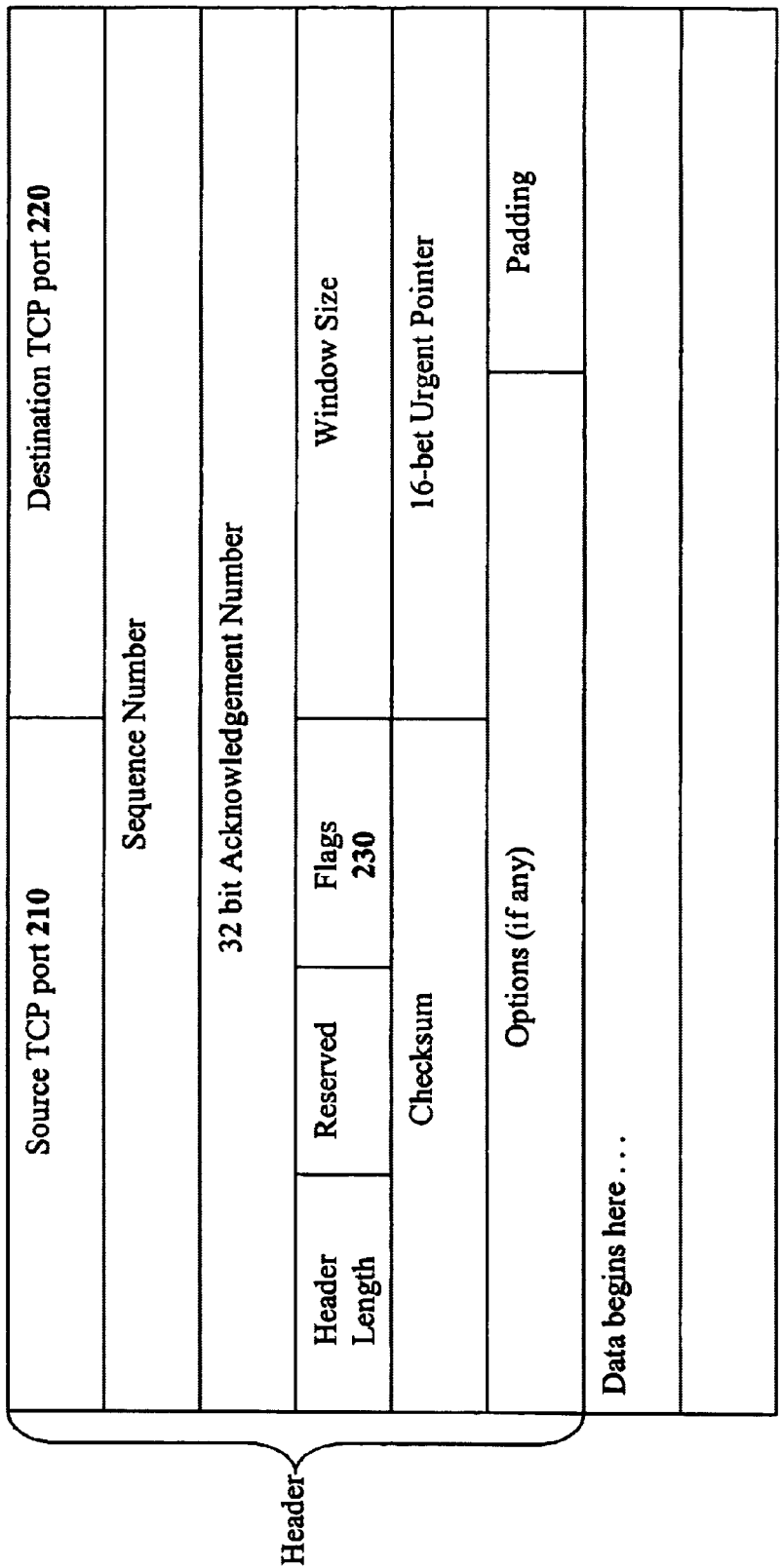
FIG. 2 illustrates the format of a packet from the Transport Control Protocol layer.

FIG. 2 illustrates the format of a Transport Control Protocol (TCP) packet. The objective of the Transport Control Protocol layer is to ensure a reliable connection between two computer nodes. Of particular interest for packet filtering are the source TCP port 210 and the destination TCP port 220. In some applications, a packet-filtering device may examine the flags 230 in the TCP packet header.

Figure 3:
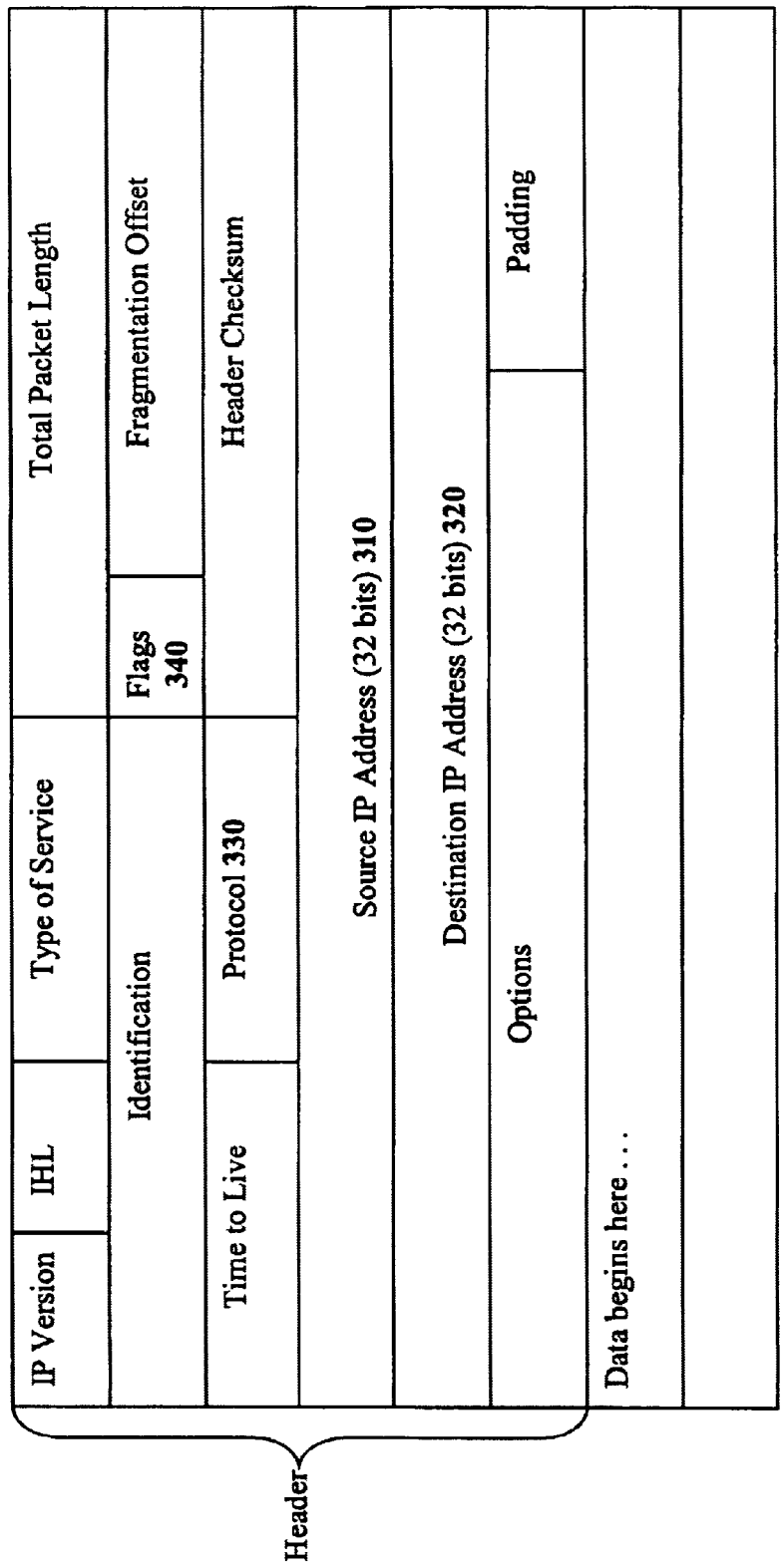
FIG. 3 illustrates the format of a packet from the Internet Protocol layer.

The TCP packet is typically enclosed within an Internet Protocol packet. FIG. 3 illustrates an Internet Protocol (IP) packet header. The objective of the Internet Protocol layer is to ensure that an Internet packet is properly routed from a source node having a source Internet Protocol (IP) address 310 to a destination node having a destination Internet Protocol (IP) address 320. Packet filtering devices examine the source Internet Protocol (IP) address 310 and the destination Internet Protocol (IP) address 320. Another important aspect that may be examined is the Protocol 330 field in the IP packet header. The Protocol 330 field specifies the type of protocol being used to transport the packet. If a TCP packet is enclosed, then the Protocol will specify the TCP protocol. Finally, a packet filter may also examine the flags 340 in the Internet Protocol header.

The Rule Processing Task

The task of rule processing consists of examining a set of aspects for a particular packet and determining the first rule that applies to a packet having those aspects. Each packet filter rule can be expressed as a set of ranges for each packet aspect that will be examined. If all of the packet's aspects fit within the defined ranges, then the rule will be applied. When a particular aspect is irrelevant for a particular rule, the rule may specify the full possible range. When a particular aspect must match a certain value exactly, the range for that particular aspect begins and ends with that certain value. Since more than one rule polytope may encompass a particular packet aspect point, the rule filter must select the rule having the higher priority.

Using a set of aspect ranges, packet filtering becomes a problem in computational geometry. Specifically, each packet-filtering rule defines a polytope in K dimensions wherein K is the number of packet aspects examined. Thus, given a point defined by the aspects of a packet, the packet-filtering engine must find the set of polytopes that encompass the point. For example, FIG. 4 illustrates a pair of two-dimensional polytopes that define two different rules in a two aspect (dimension) rule space.

Figure 4:
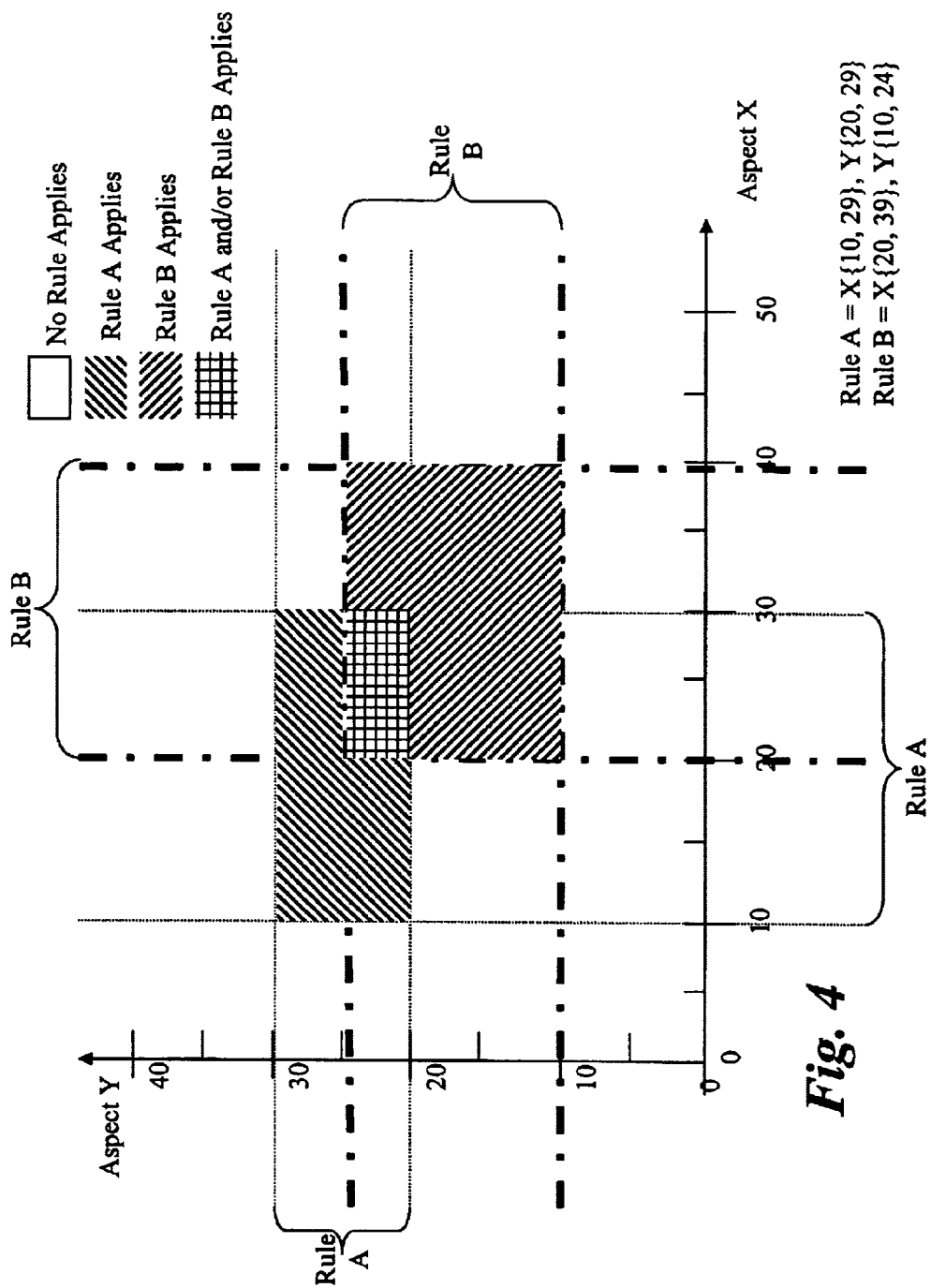
FIG. 4 illustrates a two dimensional rule space that contains two different rules.

In the example of FIG. 4, each aspect is a positive or zero integer. The aspects may be IP addresses, TCP ports, or other content from received packets. Since there are two aspects that are examined in the example of FIG. 4, the rule space is a two aspect/dimension rule space wherein each rule defines a two-dimensional rectangle polytope. Thus, Rule A forms a first rectangle and Rule B forms a second rectangle. A third aspect/dimensional would create a three-dimensional rectangular solid. Further dimensions are not easily visualized but easily implemented in practice.

High-Speed Packet Filter Rule Processing

To improve the performance of a firewall, router, switch, or other network component that performs packet filtering, the present invention introduces a high-speed rule-processing engine. The high-speed rule-processing engine pre-processes the rules to divide the rules into different packet aspect dimensions. Each dimension is then divided into individual rule ranges wherein each range has a different set of rules that may apply when compared to the adjacent ranges. Each range is then assigned a bit vector that specifies the rules that may be activate when a packet falls within the range. The pre-processing is completed by creating a different data structure to be used for searching each different dimension range. Examples of possible data structures include look-up tables and organized data trees. When a packet is received, all of the search data structures for each aspect dimension are examined in parallel to generate the assigned bit vector for that range. The bit vector results of the parallel rule processors are combined into a final rule or set of rules that need to be applied to the packet.

Rule Dimension Ranges

To implement a high-speed rule processor for packet filtering, each dimension is divided into distinct dimension rule ranges wherein each distinct dimension rule range adds or omits a possible rule from an adjacent range. For example, FIG. 5 illustrates the two dimensional rule space of FIG. 4 after both dimensions have been divided into distinct dimension rule ranges.

Figure 5:
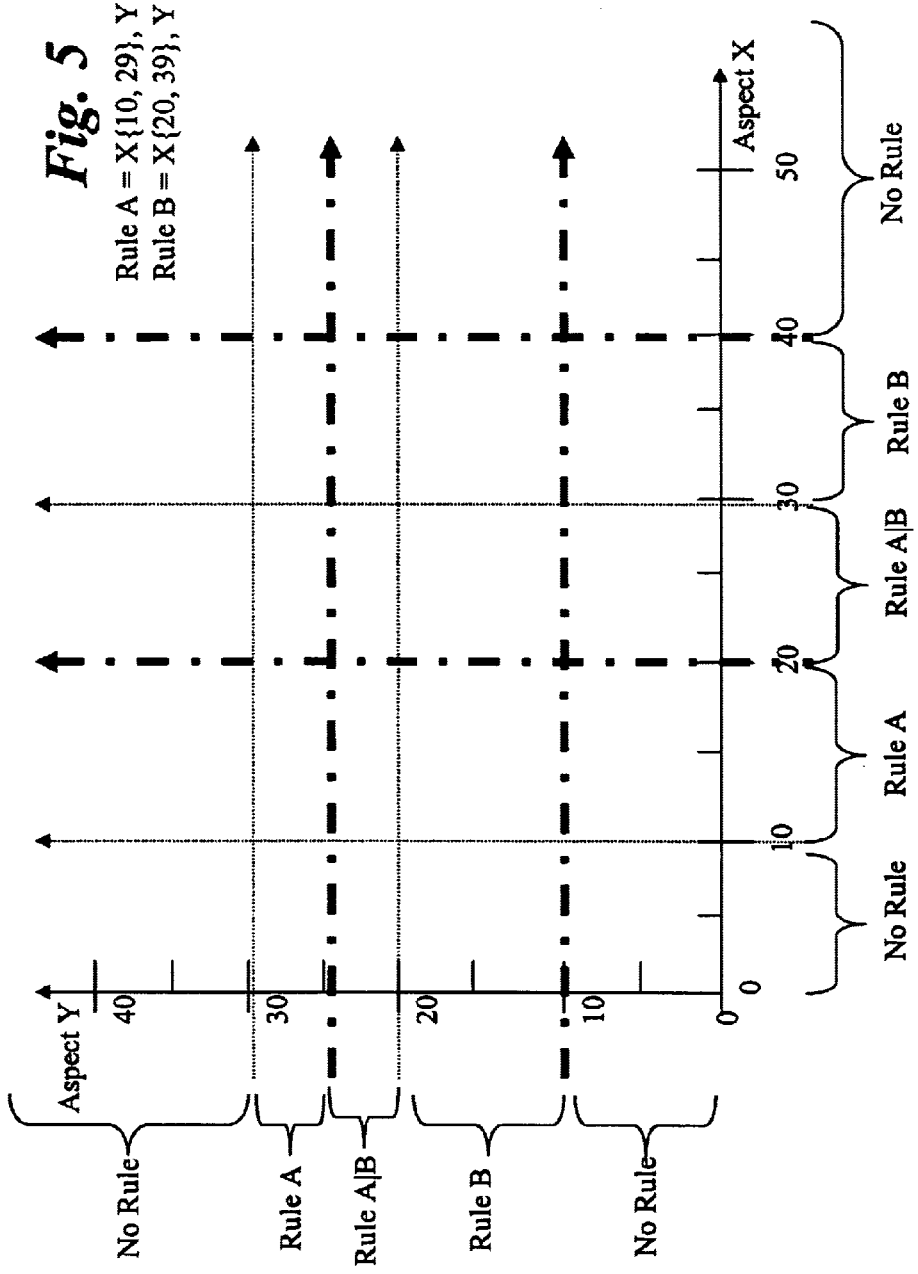
FIG. 5 illustrates the two dimensional rule space of FIG. 4 wherein each dimension has been divided into different rule ranges.

Referring to the X aspect/dimension of FIG. 5, in the range from 0 to 9, no rule applies. In the range from 10 to 19 along the X aspect/dimension, Rule A may apply. (Note that, the Y aspect/dimension must be examined to determine if Rule A really does apply.) In the range from 20 to 29 along the X aspect/dimension, Rules A and/or B may apply. In the range from 30 to 39 along the X aspect/dimension, rule B may apply. Finally, in the range above 40 in the X aspect/dimension, no rule applies.

The Y aspect/dimension of FIG. 5 is also divided into distinct dimension rule ranges. Specifically, from 0 to 9 in the Y aspect/dimension no rule applies, from 10 to 19 Rule B may apply, from 20 to 24 rules A and/or B may apply, from 25 to 29 rule A may apply, and above 30 no rule applies.

Rule Dimension Range bit Vectors

Figure 6:
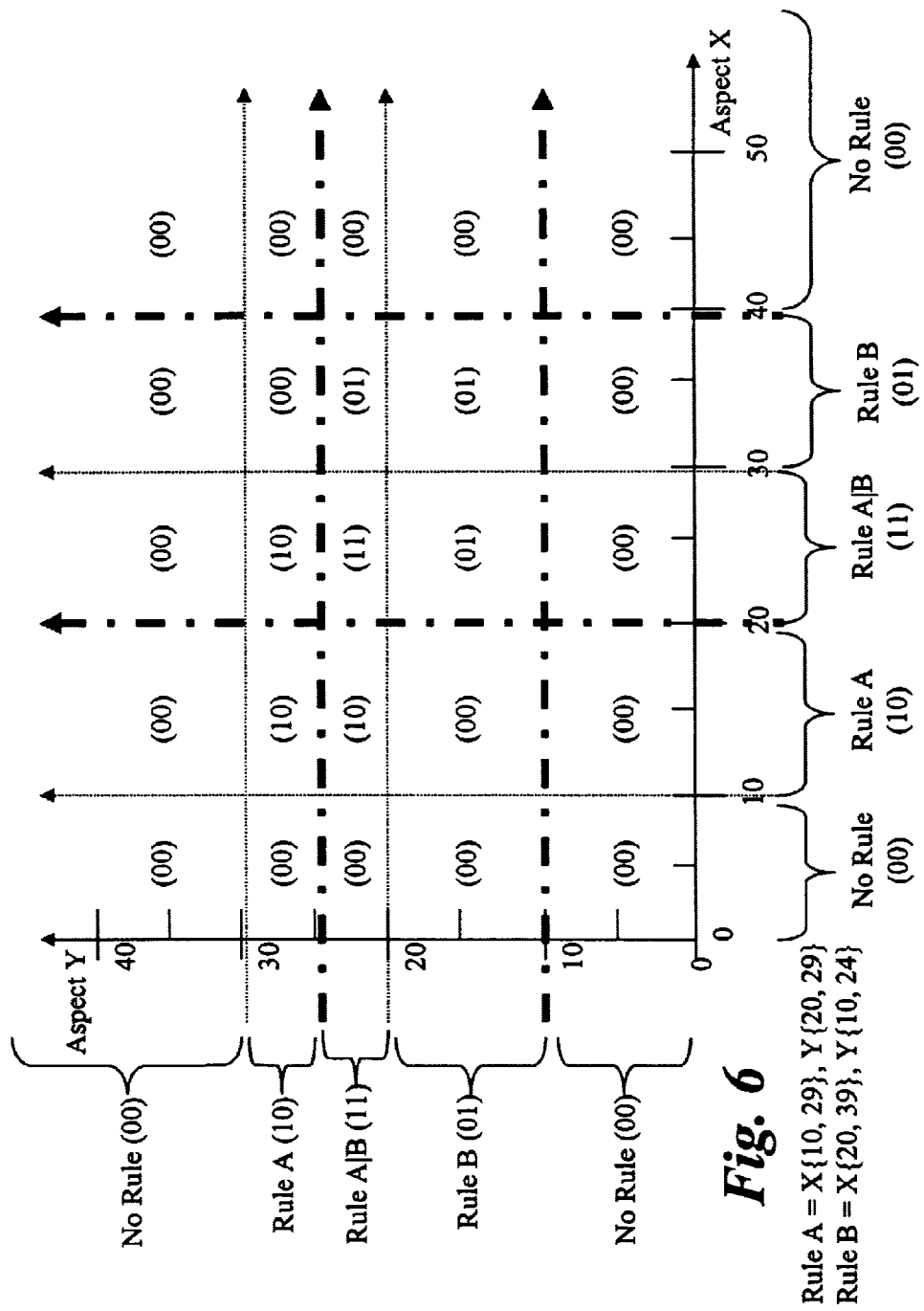
FIG. 6 illustrates the two dimensional rule space of FIG. 5 wherein each rule range has been assigned a bit vector that specifies, the rules that may apply.

After each aspect/dimension has been divided into distinct dimension rule ranges, each dimension rule range may be assigned an R-length bit vector that specifies the rules that apply to that particular dimension rule range. The R value specifies the number of rules that are being applied. If the rules are ordered in priority, then the R-length rule bit vector should be ordered in the same manner. FIG. 6 illustrates the two dimensional rule space of FIG. 5 wherein each dimension rule range has been assigned a bit vector. Since there are only two rules, the bit vector is 2 bits in length. The first position in the bit vector designates if points within the range may require Rule A. The second position in the bit vector designates if points within the range may require Rule B.

Referring to FIG. 6, the first range where no rule applies is assigned "00". The second range along the X aspect/dimension wherein Rule A may apply is assigned "10" since Rule A (the first bit in the bit vector) may apply. The third range along the X aspect/dimension wherein both Rule A and Rule B may apply is assigned "11" since both Rule A (the first bit in the bit vector) and Rule A (the second bit in the bit vector),may apply. The remainder of the ranges along the X aspect/dimension are assigned bit vectors in the same manner. The ranges along the Y aspect/dimension are also filled in the same manner.

To use the assigned bit vectors, a packet-filtering engine first classifies a received packet into the appropriate range within each dimension. In the example of FIG. 6, each packet is classified into one range along the X aspect/dimension and another range along the Y aspect/dimension. For example, a packet with an X aspect of 23 and Y aspect of 17, written as P(23,17), would be placed into the third range (from the left) along the X aspect/dimension and the second range (from the bottom) along the Y aspect/dimension. The assigned bit vectors from the different dimensions are then logically ANDed together. In the previous example of P(23,17), the "11" bit vector from the X aspect/dimension is logically ANDed with the "01" bit vector from the Y aspect/dimension to generate "01". The "01" resultant vector specifies that the second rule, Rule B, should be applied. For clarity, the ANDed values of all the different range combinations have been placed onto the rule space of FIG. 6.

If an incoming packet has an X aspect of 27 and Y aspect of 21, P(27,21), then the packet would be placed into the third range (from the left) along the X aspect/dimension and the third range (from the bottom) along the Y aspect/dimension. These classifications would output the bit vectors "11" in the X range and "11" in the Y range that are logically ANDed to produce "11". The "1" output bit vector means that both Rule A and Rule B apply to the packet. However, if the rules have been ordered in priority then only the first rule in the bit vector, the first one ("1"), will be used such that only Rule A will be applied.

Alternate Embodiment: Rule Range Look-up

In an alternate embodiment, each range may simply be assigned a range value. For example, referring to the X aspect/dimension of FIGS. 4 to 6, the range from 0 to 9 could be assigned a range value of 1, the range from 10 to 19 could be assigned the range value of 2, the range from 20 to 29 could be assigned the range value of 3, the range from 30 to 39 could be assigned the range value of 4, and the range above 40 could be assigned the range value of 5. The Y aspect/dimension would be assigned range values in a similar manner. Specifically, in the Y aspect/dimension, from 0 to 9 is rule range 1, 10 to 19 is rule range 2, from 20 to 24 is rule range 3, from 25 to 29 is rule range 4, and above 30 is rule range 5. These range values could then be used to look up a final rule to apply in an N dimensional look-up table. In the case that only the highest priority rule for a given field is needed, that value can be pre-computed amongst all matching rules in a given row and only that rule can be stored for each row in the table. In an embodiment without a pre-computed highest priority rule, the table for the example in FIGS. 4 to 6 might appear as follows:

TABLE 1

| Packet Aspect Range Value in X and Y dimension | Output rule vector |
|---|---|
| 1, 1 | 00 |
| 1, 2 | 00 |
| 1, 3 | 00 |
| 1, 4 | 00 |
| 1, 5 | 00 |
| 2, 1 | 00 |
| 2, 2 | 00 |
| 2, 3 | 10 |
| 2, 4 | 10 |
| 2, 5 | 00 |
| 3, 1 | 00 |
| 3, 2 | 01 |
| 3, 3 | 11 |
| 3, 4 | 10 |
| 3, 5 | 10 |
| 4, 1 | 00 |
| 4, 2 | 01 |
| 4, 3 | 01 |
| 4, 5 | 00 |
| 5, 1 | 00 |
| 5, 2 | 00 |
| . | 00 |

TABLE 1-continued

| Packet Aspect Range Value in X and Y dimension | Output rule vector |
|---|---|
| . | |
| . | |

Such a table based system might be useful for systems with small numbers of rules. However the memory that would be required is proportional to two times the number of Rules plus one raised to the power of the number of dimensions, expressed. mathematically as (2*Rules+1)(Number of dimensions). Thus, the memory requirements grow exponentially. Thus, such a system is not feasible for systems with large numbers of rules.

Rule Dimension Range Classification

As previously set forth, each received packet must be classified into a range along each examined packet aspect/dimension. Since these classifications are data independent along the different dimensions, the classification along each dimension may be performed in parallel by individual logic modules. In this manner, N logical searching units may perform a very complex search concurrently wherein N indicates the number of dimensions. With independent parallel searching, a single very fast search module is replaced with N search modules with lower clock speeds. The time complexity in such a parallel implementation is reduces to order of log (2R+1) for a binary tree search on each dimension. Then an additional time is required to calculate the bit-wise logical AND of these results. This method is faster than all previously known implementations.

The rule range classification along each dimension is still a time consuming problem. Every new rule raises the amount of time needed for searching each dimension. Specifically, there will be up to 2R+1 rule ranges in each dimension. (2R+1 represents the worst case scenario.) With a dimension that has m possible variations, the task is to classify the incoming packets having m possible variations into one of the up to 2R+1 rule ranges. For example, an 8-bit aspect in a packet will have 256 possible variations.

A simple method of range classifying is to use a long list of ranges that specify the required condition of each range. Such a method is simple to implement but requires far too much time to search.

One of the fastest methods of classifying the incoming packets is to create a look up table structure that maps each possible dimension value into the appropriate bit vector value for the associated rule range. The following table illustrates one possible implementation of a look-up table for the X dimension of the rule space in FIGS. 4 to 6. The able outputs the appropriate bit vector based upon the X aspect of an incoming packet.

TABLE 2

| Packet Aspect Value in X dimension | Output bit vector |
|---|---|
| 0 | 00 |
| 1 | 00 |
| 2 | 00 |
| 3 | 00 |
| . | 00 |
| . | |
| . | |
| 9 | 00 |
| 10 | 10 |
| 11 | 10 |
| . | 10 |

TABLE 2-continued

| Packet Aspect Value in X dimension | Output bit vector |
|---|---|
| . | |
| . | |
| . | |
| 19 | 10 |
| 20 | 11 |
| 21 | 11 |
| . | 11 |
| . | |
| . | |
| 29 | 11 |
| 30 | 01 |
| 31 | 01 |
| . | 01 |
| . | |
| . | |
| 39 | 01 |
| 40 | 00 |
| . | 00 |
| . | |
| . | |

The look-up table provides the fastest possible method of classifying a particular dimension into a range with an output bit vector. However, a look-up table is not always feasible. In a system that has a large number of rules and dimensions that have large numbers of possible combinations, the memory required to store a look-up table becomes impractical. For example, a 32-bit IP address has $2^{32}$ possible permutations such that a very large $2^{32}$ entry look-up table would be required. Furthermore, in a system with thousands of rules, each bit vector would be thousands of bits long. Constructing such a large look-up table is not economically feasible.

Figure 7:
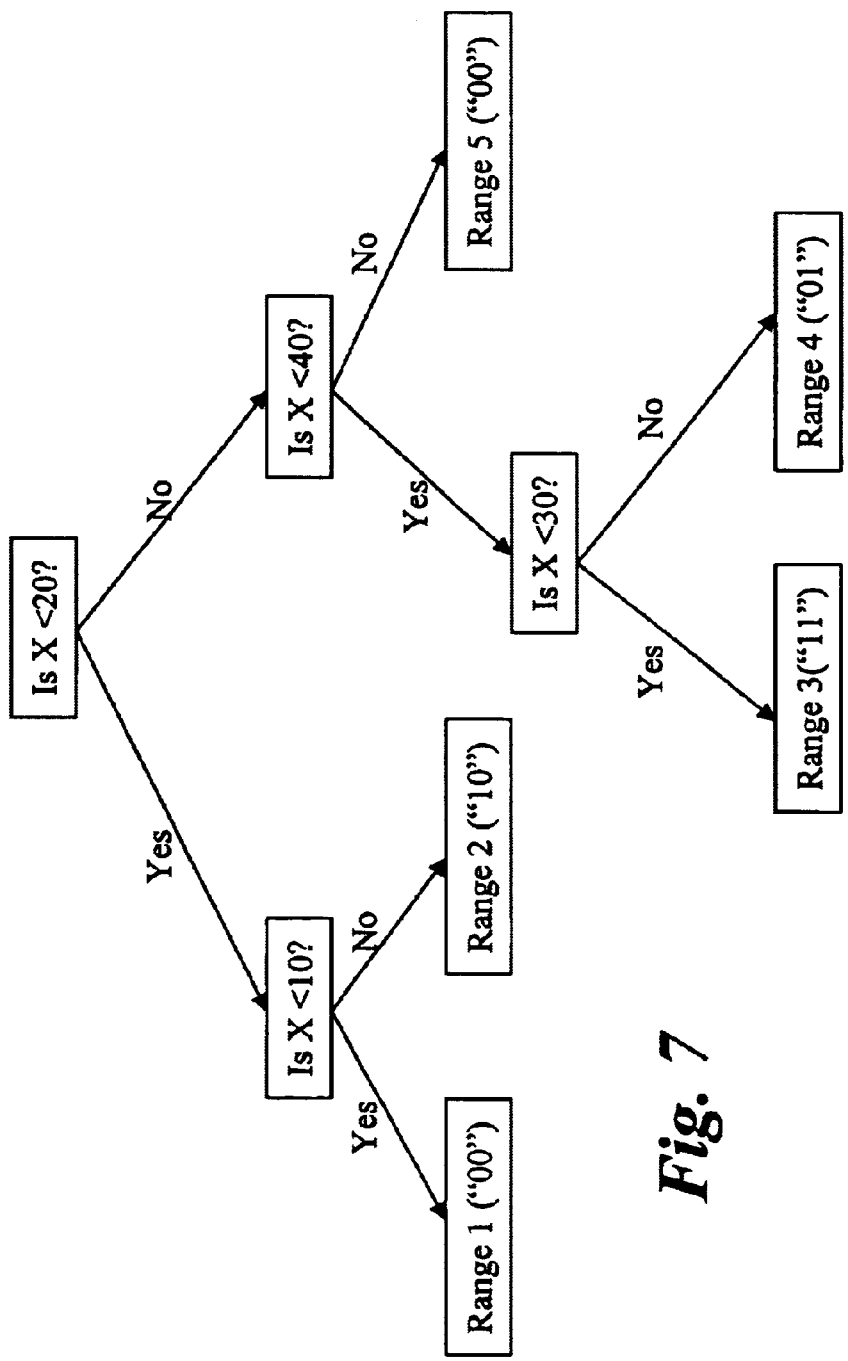
FIG. 7 illustrates a tree structure that may be used to organize the X aspect ranges along the X dimension illustrated in FIGS. 4 to 6.

Another method of creating a data structure for quickly generating bit vectors is to use a search tree structure such as a Patricia tree or a binary tree. A search tree structure greatly reduces the amount of memory required by eliminating redundant data from the search structure. However, a tree structure will require more processing time to search. Specifically, such a tree search will require a time amount that is a logarithmic function of the two times the number of rules plus one. [Order(log(2R+1))] FIG. 7 illustrates one possible tree structure that can be used to quickly search the rule ranges of the X dimension illustrated in FIGS. 4 to 6.

Since the different aspects of a packet will vary in the number of possible combinations, each dimension can be implemented with a different search structure. For example, one possible packet-filtering engine would examine a 32-bit source IP address, a 32-bit destination IP address, and an 8-bit protocol value. In such a three dimensional packet filtering system, the relatively small 8-bit protocol dimension could be classified quickly with a two hundred and fifty-six (256) entry look-up table and the larger 32-bit dimensions could be classified using Patricia tree structures or binary tree structures. All three different dimensions could be searched in parallel using three different searching units. The bit vector outputs from the three search units could then be logically ANDed to generate a final rule bit vector that specifies the rule (if rules are prioritized) or rules (if all matching rules are to be applied) to be used on the packet.

Operation of one Embodiment

Figure 8:
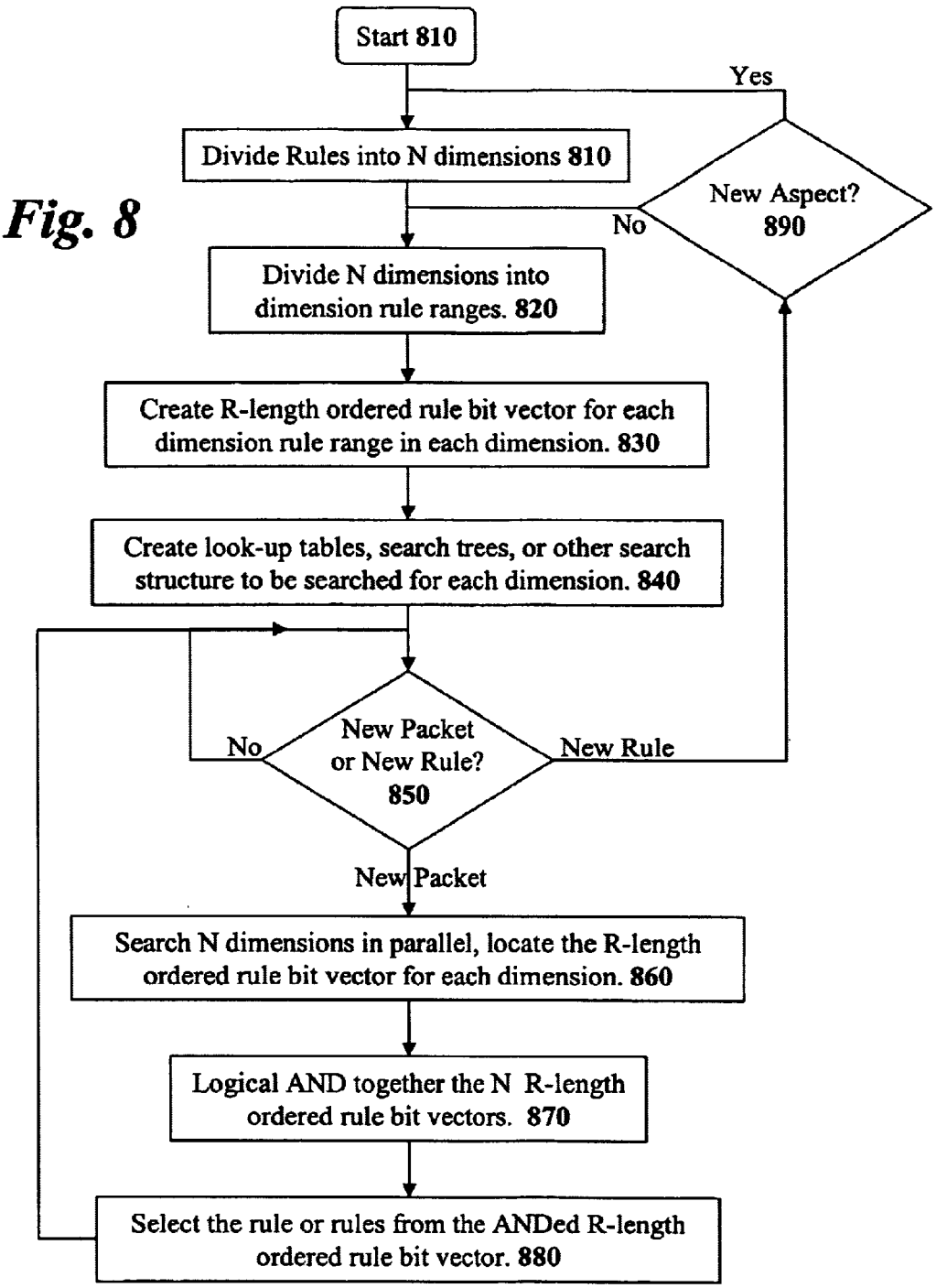
FIG. 8 illustrates a flow diagram that summarizes the rule processing methods of the present invention.

FIG. 8 illustrates a flow chart that summarizes the teachings of the present invention. Referring step 810 of FIG. 8, the first task is to divide the rules into N aspects/dimensions. The N dimensions are orthogonal aspects of each packet that may be examined and tested in each rule. For example, in a packet filtering system that only examines and tests the 32-bit source IP address, a 32-bit IP destination address, the 16-bit source TCP port, and the 16-bit destination TCP port, the packet filtering engine would be divided into four dimensions.

Next, at step 820, each of the N dimensions is divided into a set of dimension rule ranges. Each rule range defines a non-overlapping contiguous range of values in particular dimension and the rules that may apply to packets that fall within that rule range. At step 830, each rule range is assigned an R-length bit vector that specifies the rules that may apply to packets that fall within that rule range. If the rules are prioritized wherein only the highest priority rule will be applied then the bit vectors will be organized into an order bit vector wherein the highest priority rule is at the beginning of the rule bit vector and the lowest priority rule will be at the end of the rule bit vector.

Finally, at step 840, the rule preprocessing is completed by creating a search structure (such as a look-up table, Patricia tree structure, or binary tree structure) for each of the N dimensions. The N search structures may be different for each dimension. Each search structure may be used by an independent search unit such that all N dimensions may be searched concurrently.

At step 850, the packet processing may begin. When a new packet is received at step 850, the method proceeds to step 860 wherein the N dimensions are searched using the created search structures. The output of each of the N search structures will be an R-length bit vector. At step 870, the N output bit vectors are logically ANDed together to produce a final rule bit vector. Finally at step 880, the final rule bit vector is used to select the rule or rules to be applied. If the rules are prioritized, then only the first matching rule (the highest priority rule) will be applied. The method returns back to step 850 to process additional packets.

New rules may be added at step 850. If a new rule is submitted, the method proceeds to step 890 wherein the rule is examined to determine if the new rule examines and tests a new aspect of the packet. If a new aspect is to be tested, then the method proceeds to step 810 wherein a new dimension will be added to the packet-filtering engine. Alternatively, if at step 890 the method determines that the new rule will only test an existing packet aspect, then the method proceeds to steps 820 through 840 wherein the new rule is preprocessed to create a new set of rule ranges for each dimensions, new longer rule bit vectors are generated, and new search structures are created.

High-Speed Rule Processors for Packet Filtering

To construct a rule processor for a network device that performs optimal packet filtering, the parameters of the particular application should be taken into consideration. When the parameters of the particular application are known, the rule processor can be designed in a manner that operates most efficiently.

When There are a Large Number of Rules or Dimensions

When the number of rules is not extremely large and the number of dimensions is relatively large the various dimensions are searched in parallel. Since there are a large number of dimensions, a large number of search units would be useful. However, some of the independent search units may be used to search more than one dimension as will be described later. The rule vector results of each of the parallel searches are ANDed together to generate a final rule vector. The first rule from the final rule vector is used.

Similarly, when the number of rules is relatively large and the number of dimensions is not extremely large the various dimensions are searched in a parallel. In such a unit, the rule vectors will be very large. However, the architecture can be designed to handle this aspect. In one embodiment, the search units identify a coded value. The coded value is then used to identify a rule bit vector in a separate bit vector logic unit that can perform logic operations on very large bit vectors.

When the Number of Values in a Dimension is Small

When the number of values for a particular dimension is small, a look-up table should be used. For example, an Internet Protocol Type of Service (IP TOS) is an eight-bit value. Since the IP TOS field is only 8 bits, there are only two hundred fifty-six possible different values. To locate the rule vector for such a dimension, the search engine merely needs to index into a two hundred fifty-six entry look-up table that contains the pre-computed rule vectors.

When Rules are Mainly Disjoint

A disjoint set of rules is a set of rules where there is no overlap between different rules. FIG. 9a illustrates a set of disjoint rules. If the rule sets are completely disjoint, then the rule processor does not have to handle the situation where rules overlap each other.

Figure 9B:
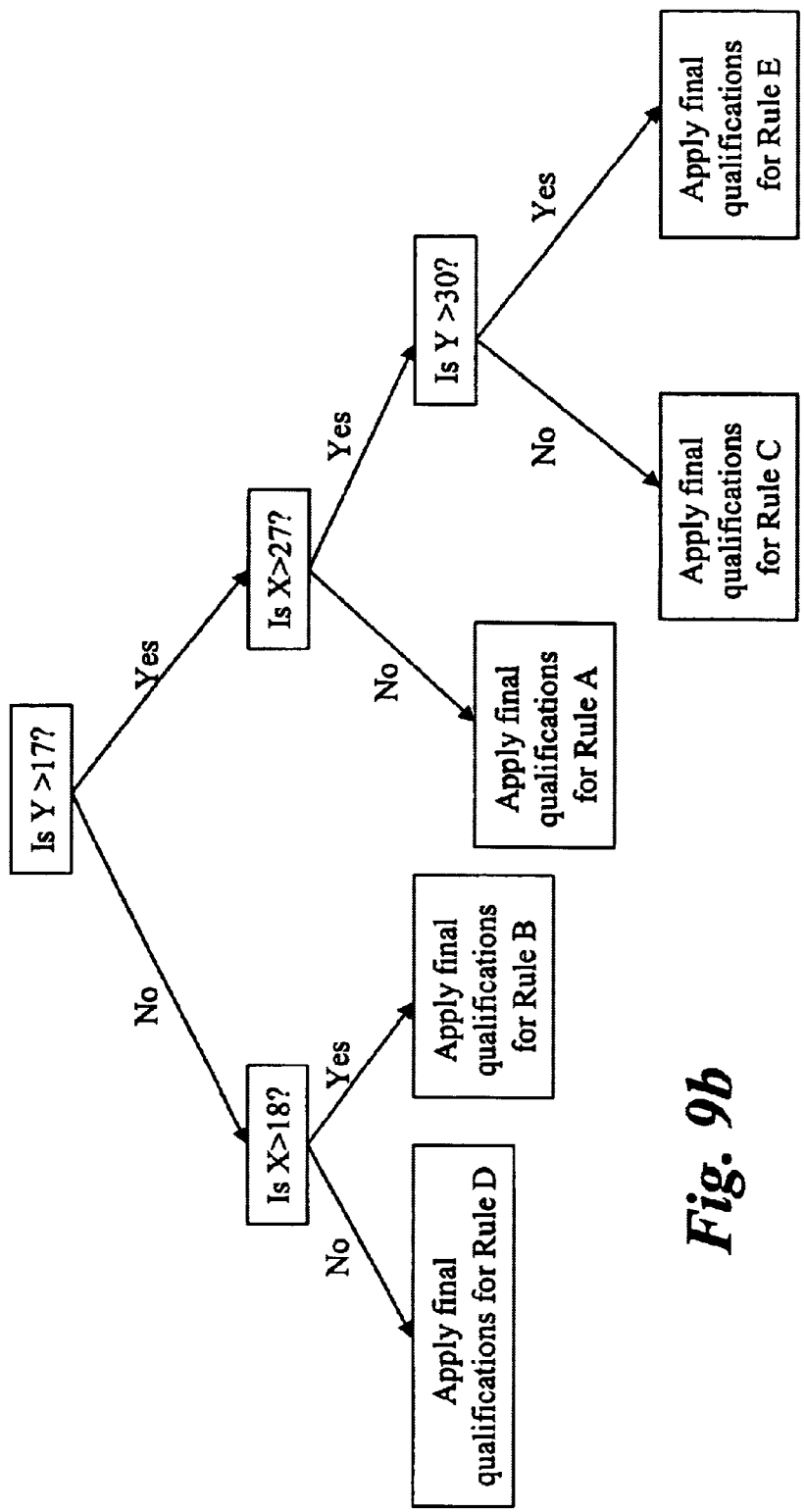

When rules are disjoint, the rule processor should use a search tree. To illustrate such an embodiment, FIG. 9b illustrates a binary search tree that may be used to locate the proper rule in the disjoint rule set of FIG. 9a. Note that the particular example implementation of FIG. 9b uses a binary search tree to locate the proper rule. However, search trees can also be implemented with more than two possible outcomes at each decision stage to speed up processing if necessary.

Since a search tree can be searched relatively quickly, a hardware search engine may not be required for applications that may easily be divided into searches that can be performed with a search tree. Thus, a rule set that only has disjoint rules can likely be implemented with software alone.

Figure 10B:
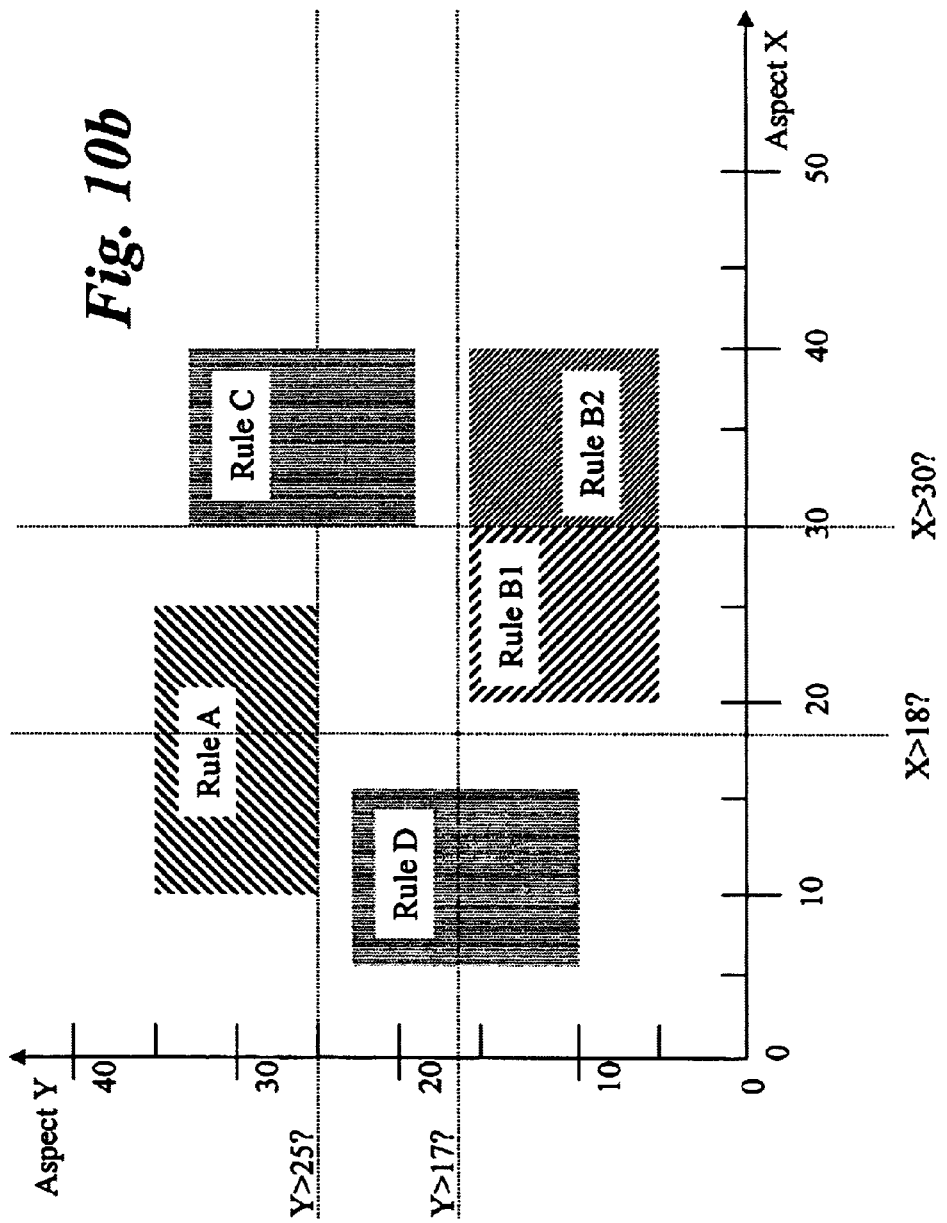
FIG. 10b illustrates a two-dimensional rule space of FIG. 10a wherein one rule has been divided into two rules.

Not all disjoint rule sets are as simple as the rule set of FIG. 9a. For example, FIG. 10a illustrates a rule set wherein no rule can divide the rule set into groups without dividing at least one rule. To handle such situations, a rule is divided into two rules with contiguous areas. Specifically, FIG. 10b illustrates the rule set of FIG. 10a wherein the Rule B has been divided into Rule B1 and Rule B2. The rule set can then be searched with a binary search tree as set forth in FIG. 10c.

If a rule set is mostly disjoint, then a search tree implementation may still be the best implementation choice. For example, if most rules are disjoint except for one or two rule overlaps then the search tree can be used to locate a rule or a rule overlap situation. The rule overlap situations can be further resolved with additional search tree entries with additional search tree entries. For example, the search tree may contain redundant copies of the rule in multiple areas of the search tree.

When a Dimension Range is Defined with a Value and Mask

In an Internet Protocol based packet filter, some of the fields that are examined are defined with a value and a mask. Specifically, the "network" portion of an IP address is defined using a network address and a subnet mask. The network address defines a set of most significant bits that define a network address that the IP host address belongs to. The subnet mask defines the size of the network in the least significant bits. The most significant bits in the network address value and the least significant bits of the subnet mask value create contiguous ranges.

So long as these values and masks create contiguous parts these value and mask definitions will produce parts that never intersect. For example, in masks where the ones of the mask appear in the most significant bits (MSBs) and the zeros of the mask appear in the (LSBs) the defined ranges will be contiguous. Such contiguous value and mask dimension may easily be searched using a Patricia tree.

When Rule Dimensions are Distinct Points

Figure 11:
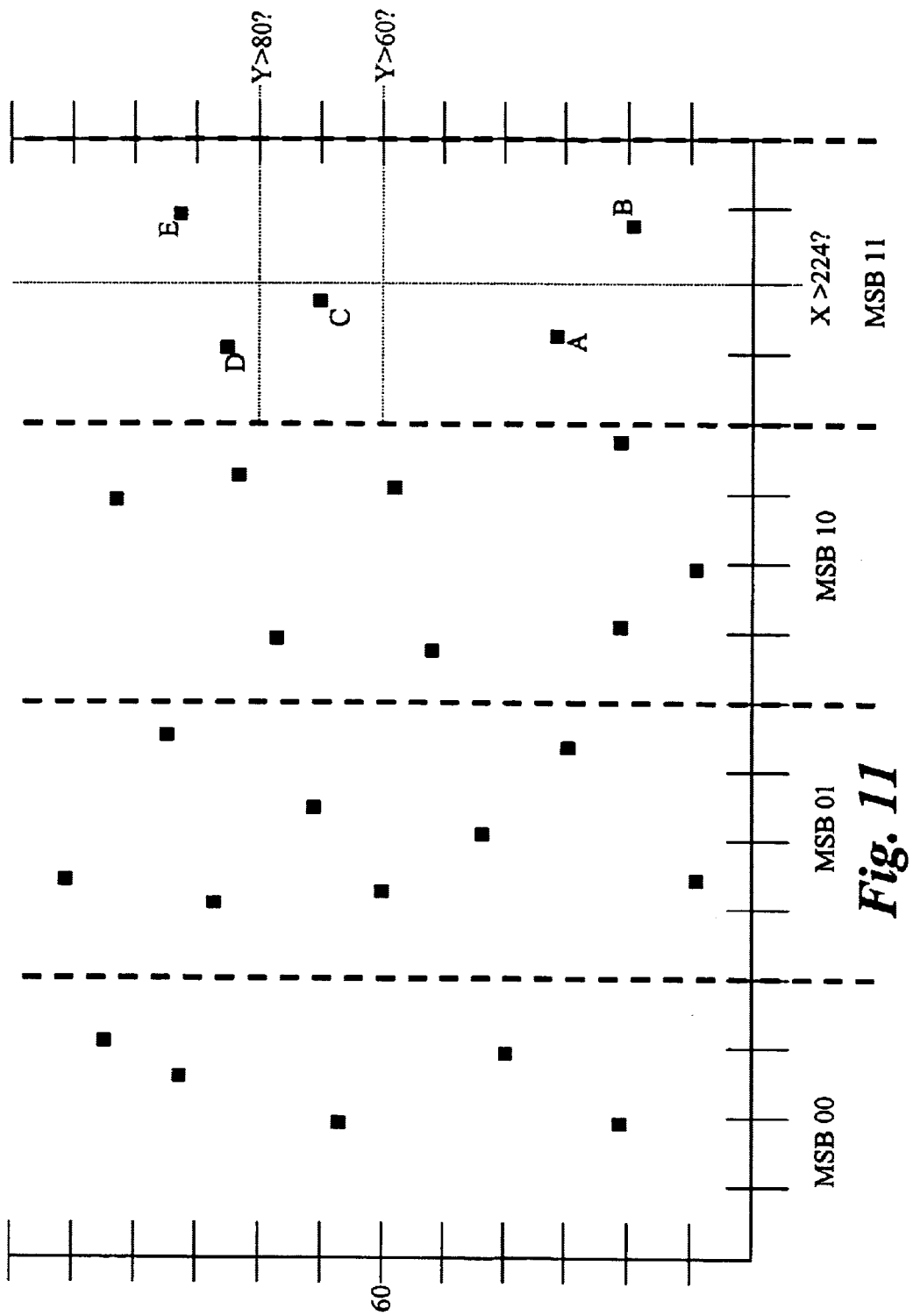
FIG. 11 illustrates a two-dimensional rule space with a set of exact match point rules that have been divided into hashed sets.

The situation where rules are defined by dimensions that are made up of distinct points is a subset of the disjoint rule situation. FIG. 11 illustrates a two-dimensional rule space where both dimensions are defined with individual points. Since distinct points are a subset of the disjoint rule set, a search tree implementation may be the best type of search mechanism.

Referring to the two-dimensional rule set of FIG. 11, a large number of rule points are illustrated. When there are a large number of rule points, a binary tree search may take several iterations to locate the proper rule. In such a situation, the rule points can be hashed before a search tree is used. In the example of FIG. 11, the rule set has been hashed by first examining the two most significant bits (MSB) in the X dimension to select a particular search tree to be used.

Figure 12:
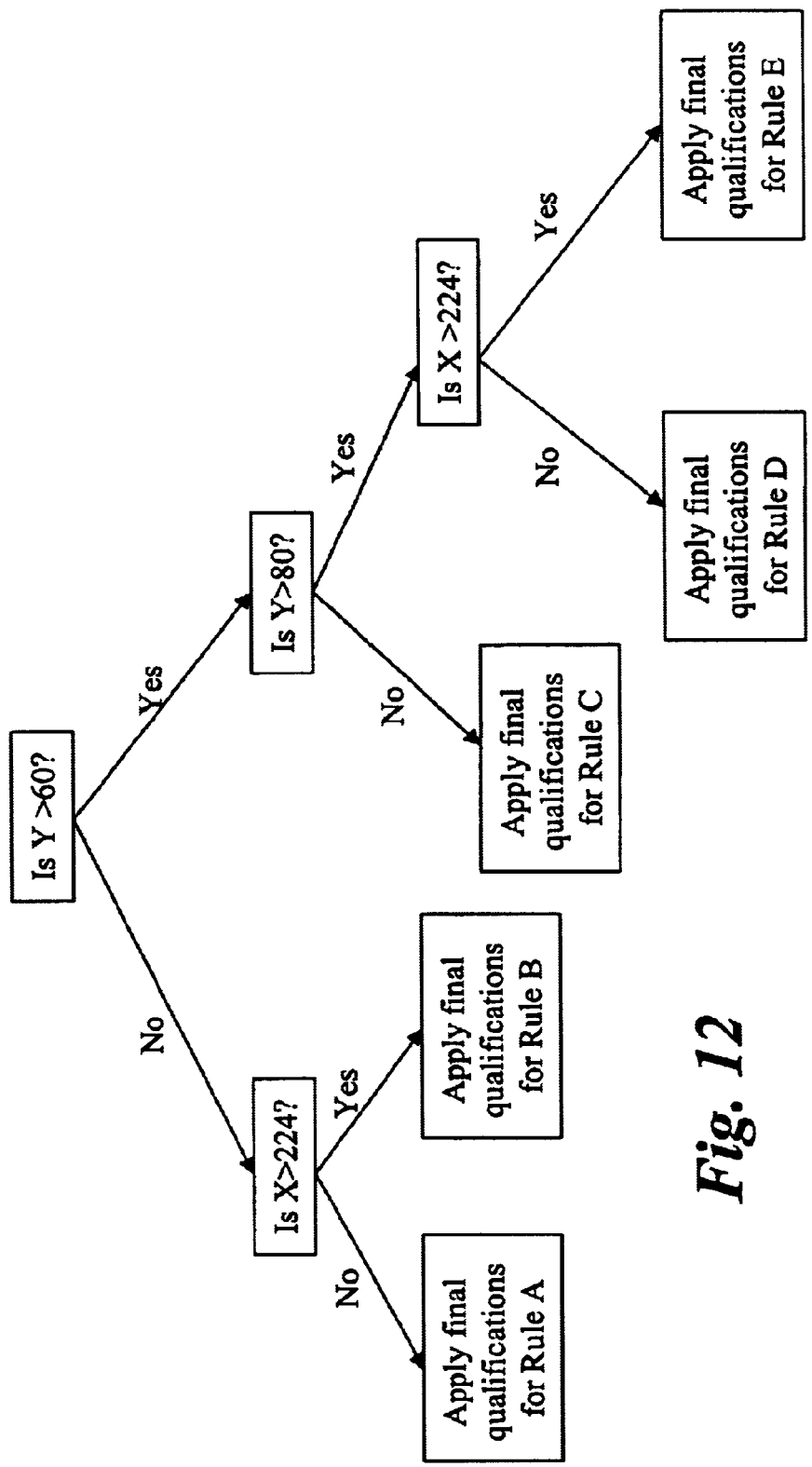
FIG. 12 illustrates a search tree that may be used to search the exact match point rule space of FIG. 11.

Referring to FIG. 11, if the most significant bits are "11" then the search tree in FIG. 12 is used. Referring to FIG. 12, the binary search tree locates a particular rule in at most three iterations.

When the Number of Rules and Dimensions are Small and an Exact Match is Needed

Figure 13A:
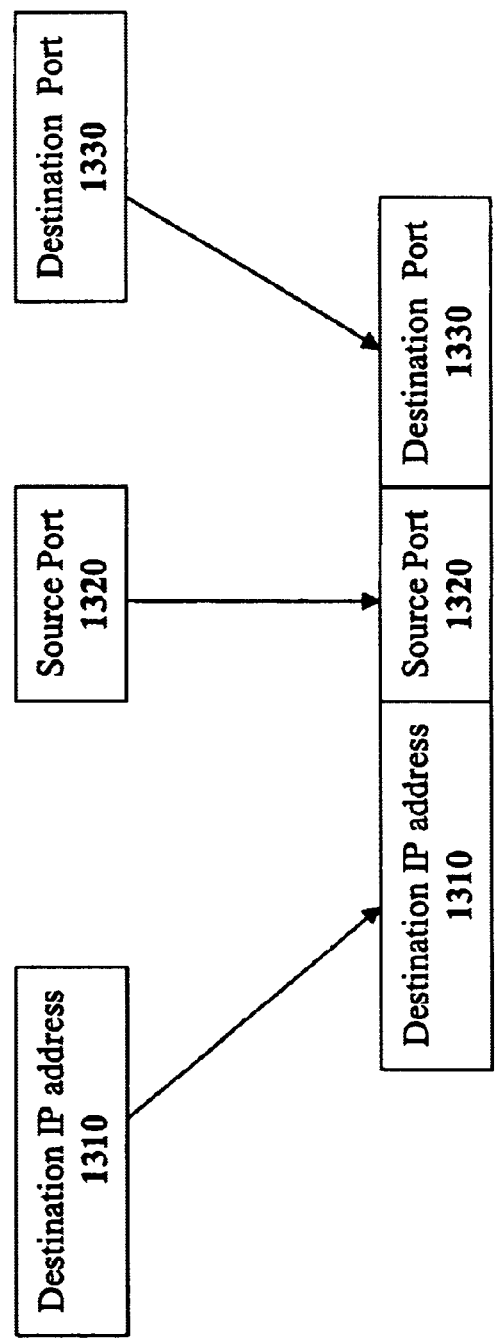
FIG. 13a illustrates a concatenated search key.

When the number of dimensions and rules is relatively small, then the various dimension values can be concatenated together to generate a single key. For example, FIG. 13a illustrates a single search key created by concatenating a destination IP address 1310, a source TCP port 1320, and a destination TCP port 1330.

The single search key in can be used to organize a search tree or other search structure. For example, the concatenated value can be used as the key to search a search tree. FIG. 13b illustrates four-way Patricia tree that analyzes two bits of the search key at a time. The search tree should be constructed such that it only examines bits that are differ. Once the matching rule is located, that rule is applied.

When One Dimension is the TCP Port Number

The TCP protocol uses a 16 bit port number to identify multiple different TCP connections made by a computer system with a single IP address. However, the TCP port number system also serves a second purpose. Specifically, a subset of the available TCP port numbers have been assigned to well known services such that a client may access a well-known service by accessing the proper TCP port number at a particular service. For example, SMTP mail service uses TCP port 25, HTTP web service uses TCP port 80, NNTP network news transport protocol uses TCP port 119, and the FTP file transfer protocol uses TCP ports 21 and 20.

All of the existing well-known services that use defined TCP port numbers use port numbers between 0 and 1023. These ports (0–1023) are known as "server ports". All TCP port addresses above 1023 may be used freely. Such ports are known as "client ports".

Many packet-processing rules are dependent upon the type of protocol that is being used. For example, a real-time streaming protocol may receive higher priority than the FTP file transfer protocol. Furthermore, accesses to particular services are often limited due to security and bandwidth conservation reasons. Thus, the TCP port is usually examined by packet filtering engines.

In contrast to TCP ports 0 to 1023, the TCP ports above 1023 are typically client port numbers. Since these port numbers are ephemeral in nature, such ports are typically bundled together with a common policy rule that applies to all TCP port numbers greater than 1023. Thus, TCP connections that use port numbers over 1023 are usually all handled in the same manner.

To take advantage of the observation, the search structure for a TCP port number can be significantly simplified. Specifically, the search structure can be a simple 1025 entry look-up table. The first 1024 entries of the look-up table can be used to assign rules to various well-known server protocols (TCP ports 0 to 1023). The one remaining entry (the 1025th entry) can be used to handle all communication over TCP connections that use a TCP port greater that 1023 since all such communications are handled in the same manner.

When Dimensions are Defined in a Sequential Manner

Many rules are mostly easily expressed in a sequential manner. One typical sequential rule application is service classes. Service classes divided different service users into different service class groups where each service class group may have a different set of rules that apply. For example, one set of rules may be used for consumer internet end-users, another set of rules may be used for business internet customers, and yet another set of rules may be used for high priority users of real-time applications such as internet telephony or video conferencing.

In such an application, the rule-processing engine should follow the rule definitions and process the dimensions in a sequential manner. First, the rule-processing engine would examine a first dimension to determine which class of service a customer has. The first dimension that identifies the customer class may be the source IP address or, better, a unique media access controller identifier. Then, after a class of service has been identified, the rules set for that customer class is applied using the remainder of dimensions such as the destination IP address, the destination port number, the source port number, etc. Thus, the data sets that are used to perform the second layer of search are dependent upon the first dimension examined.

Another application example of a sequential rule processing system could be constructed using TCP ports. As described in the previous section, the TCP port number usually describes the protocol used in the TCP connection. Different protocols are often handled with different rules. For example, a streaming audio protocol should receive higher priority treatment that a file transfer protocol. Thus, different rule sets will apply depending upon the protocol of the TCP connection. This can be implemented using a fast 1024-entry look-up table that first classifies each packet based upon its protocol. The packet is then processed using a particular rule set assigned to that protocol.

The sequential searching system provides the advantage that the amount of rules is sharply reduced after the first dimension is examined. In this manner, sequential searching systems can handle larger number of rules.

Hardware Implementation Optimizations

In the Internet packet processing environment there are several different packet fields that are examined including destination IP address, source IP address, Destination TCP port, source TCP port, protocol, Quality of Service, etc. The fields vary significantly in size: IP addresses are 32 bits, TCP ports are 16 bits, and protocols are 8 bits. To build an optimized system, the hardware should be designed in a pipelined approach that takes into account the different dimension sizes.

One implementation would provide the source and destination IP addresses to dedicated search units. IP searches may take the longest period of time since a large number of bits are being compared. Dedicated search units may also be provided for TCP ports. The TCP port search units may be implemented as search trees. However, the search unit for a destination TCP port be constructed with a 1025 entry look-up table since all ports above 1023 are usually handled in the same manner, as described in an earlier section. The smallest dimensions are searched using look-up tables. Several very small dimensions may be concatenated as earlier described to reduce the number of independent search units. The concatenated value may be searched using a search tree or look-up table The simplest searches will be completed first. The results of the simple searches can be can immediately be combined. For example, rule vectors produced by simple search units can be immediately logically ANDed together when they become available.

When the rule vector results of the IP address searches finally becomes available, only a single rule vector value from all the smaller dimensions needs to be logically combined since the rule vector results from all the simple searches have already be combined into a single value. Thus, a pipelined approach simplifies the searching such that the search only requires as much time as is needed to process the largest dimension.

Combining Techniques in an Implementation

The techniques presented in the document can be combined in various manners as the specific application parameters dictate. To provide an example of this, one implementation that combines various teachings is presented.

Figure 14:
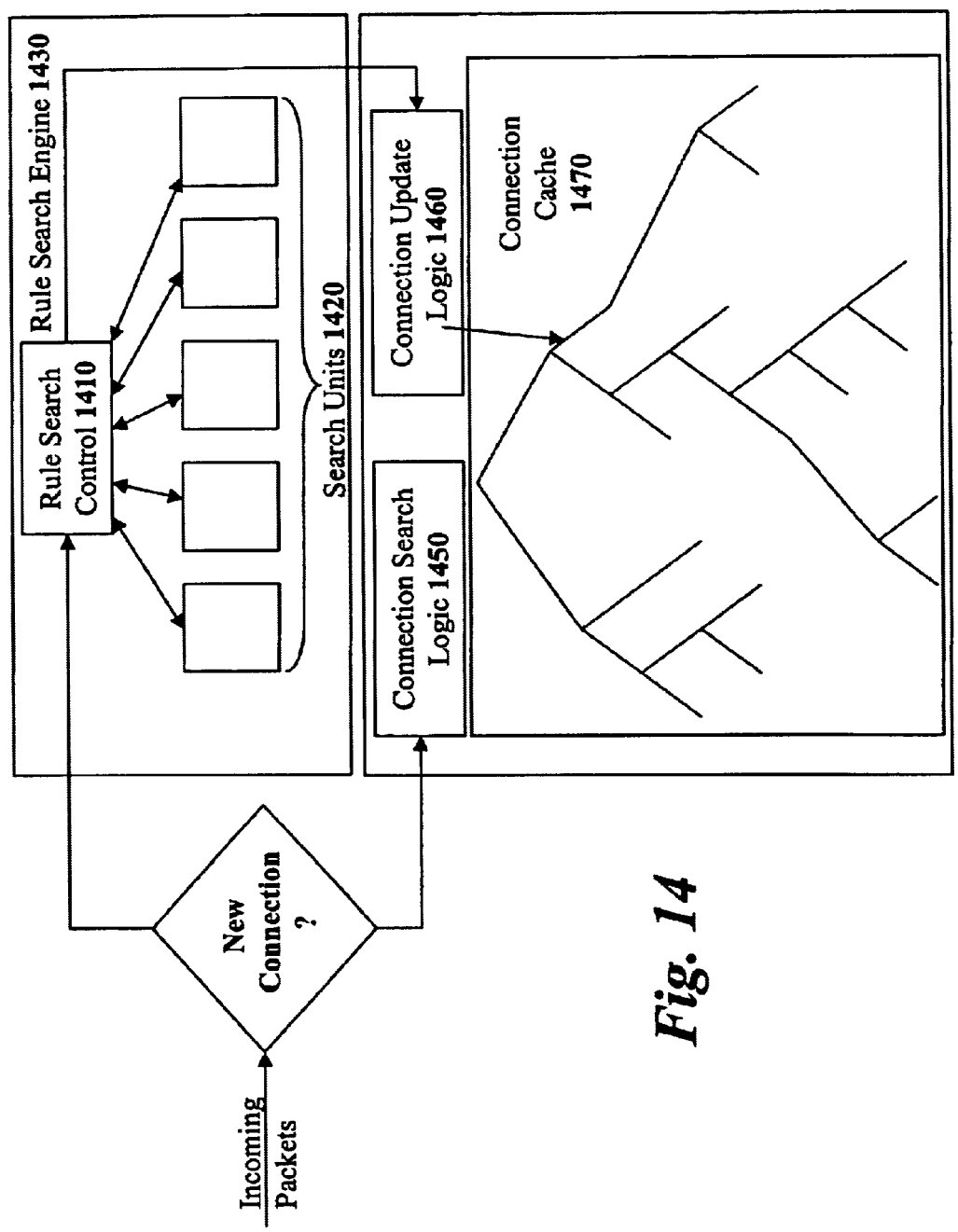
FIG. 14 illustrates a block diagram of the rule processor portion of a packet-filtering device that uses some teachings of the present invention.

FIG. 14 illustrates a conceptual block diagram of a rule processing system for an Internet Protocol packet-filtering device. Referring to the left-hand side of FIG. 14, an incoming packet is received. The incoming packet is examined to determine if it belongs to a known existing connection or is a packet that is initiating a new TCP connection. One method of performing such a determination is to examine a SYN bit on the TCP packet. If the SYN bit is set, then the packet is attempting to open a new connection. If the SYN bit is clear, then the packet should belong to an existing connection.

If the SYN bit is set such that the packet is for a new connection, the set of rules must be examined to locate a rule for the connection. Thus, the packet is passed to a rule search control unit 1410 in a rule search engine 1430. The rule search control unit 1410 passes the packet to a set of parallel search units 1420 so a rule for the connection can be identified. The rule search control unit 1410 and the parallel search units 1420 may implement the main high-speed rule processing method described in FIG. 8. Once a rule for the connection has been identified, the rule is applied to the packet and a new connection entry is placed into a connection cache 1470.

The connection cache 1470 is a database structure that stores information on all known connections through the packet-filtering device using a search technique.

When a new connection is created, connection update logic 1460 places information into the connection cache that identifies the connection and includes all the information necessary to maintain that connection. For example, a connection cache entry may contain a source IP address, a destination IP address, a source TCP port, a destination TCP port, and a protocol type. Additionally, each connection cache entry may include a rule that should be applied to packets that use the connection. The connection update logic 1460 may periodically remove idle connection entries for connections that have been broken. Since each connection is identified with specific values, the connection cache can be organized into a search structure using the teachings for distinct point searching. For example, the connection cache may be searched using the teachings of FIG. 11, 12, and the accompanying text.

When the packet-filtering device receives a packet with the SYN bit clear such that the packet belongs to an existing connection, the packet is passed to connection search logic 1450. The connection search logic 1450 searches the known connections in the connection cache 1470 using a search technique to identify the connection to which the packet belongs. As described in the preceding paragraph, the connection search logic 1450 may be quickly searched using the search technique for identifying distinct points in rule dimensions. Such a point based search technique may be used since each connection is uniquely identified by the source IP address, the destination IP address, the source TCP port, the destination TCP port, and the IP protocol. When the connection entry is identified, the rule specified within the connection entry (or pointed to by the connection entry) is used to process the packet.

In operation, most packets received by the packet filtering engine of FIG. 14 will be packets that belong to an existing connection such that the fast search of the connection cache 1470 is used. Only when a new connection is created will the complex rule search engine 1430 be used. Thus, for most packets received, the rule processing will be performed very quickly using the connection cache 1470.

The foregoing has described a method and apparatus for performing high-speed rule processing for packet filtering. It is contemplated that changes and modifications may be made by one of ordinary skill in the art, to the materials and arrangements of elements of the present invention without departing from the scope of the invention.

We claim:

1. A method of performing network packet filtering with an N dimensional rule set, said method comprising:

dividing said N dimensional rule set along a first dimension into different service class ranges, said service class ranges specifying different network service classes;

preprocessing said N dimensional rule set along said first dimension to generate a first search structure with a first set of class ranges along said first dimension and, each service class range having a subset of service class rules;

preprocessing each subset of service class rules associated with each service class range to generate subset of rule ranges along each of said N−1 remaining dimensions;

receiving a packet;

initially searching said first search structure along said first dimension of said received packet to select an associated service class of said packet and to select a subset of rule ranges for said associated class of said received packet;

subsequent to initially searching said first search structure, searching said selected subset of rule range along said N−1 dimensions in parallel to generate N−1 sets of possible rules along said N−1 dimensions;

logically combining said N−1 sets of possible rules to generate a final set of possible rules for said associated service class; and applying said final set of possible rules.

2. The method of performing network packet filtering as claimed in claim 1 further comprising:

generating a rule bit vector for each subset of rule ranges along each of said N−1 dimensions.

3. The method of performing network packet filtering as claimed in claim 1 wherein said first search structure comprises a look-up table.

4. The method of performing network packet filtering as claimed in claim 3 wherein said first search structure comprises a search tree.

5. The method of performing network packet filtering as claimed in claim 1 further comprising:

generating a subset search structure for each subset of rule ranges along each of said N−1 dimensions.

6. The method of performing network packet filtering as claimed in claim 5 wherein one of said subset search structures comprises a look-up table.

7. The method of performing network packet filtering as claimed in claim 1 wherein applying said final set of possible rules comprises selecting a highest priority rule in said final set of possible rules for said associated service class.

8. The method of performing network packet filtering as claimed in claim 1 wherein applying said final set of possible rules comprises applying all rules in said final set of possible rules for said associated service class.

\* \* \* \* \*